United States Patent
Tanaka et al.

(10) Patent No.: US 7,584,729 B2
(45) Date of Patent: Sep. 8, 2009

(54) VARIABLE VALVE TIMING CONTROLLER FOR INTERNAL COMBUSTION ENGINE

(75) Inventors: Toshikazu Tanaka, Kariya (JP); Masaomi Inoue, Kariya (JP); Yuuichi Takemura, Anjo (JP); Zenichiro Mashiki, Nissin (JP)

(73) Assignees: DENSO Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 96 days.

(21) Appl. No.: 11/896,120

(22) Filed: Aug. 29, 2007

(65) Prior Publication Data
US 2008/0071463 A1    Mar. 20, 2008

(30) Foreign Application Priority Data
Aug. 30, 2006    (JP)    ............... 2006-233282

(51) Int. Cl.
*F01L 1/34*    (2006.01)
(52) U.S. Cl. .................. 123/90.15; 123/90.17; 464/160
(58) Field of Classification Search .............. 123/90.15, 123/90.16, 90.17, 90.18, 90.12; 464/1, 2, 464/160
See application file for complete search history.

(56) References Cited

U.S. PATENT DOCUMENTS 7,059,285 B2    6/2006    Schäfer et al.
7,152,561 B2    12/2006    Schäfer et al.
2005/0201036 A1    9/2005    Santero et al.
2006/0042579 A1    3/2006    Izumi et al.
2007/0056542 A1    3/2007    Gregor et al.

FOREIGN PATENT DOCUMENTS

DE    4110195 A1    10/1992

OTHER PUBLICATIONS

Extended Search Report dated Jan. 14, 2008 in EP Application No. 07115159.1.
U.S. Appl. No. 11/896,119, filed Aug. 2007, Tanaka et al.
Chinese Office Action dated Jan. 9, 2009 issued in corresponding Chinese Application No. 200710146262.9, with English translation.

*Primary Examiner*—Ching Chang
(74) *Attorney, Agent, or Firm*—Nixon & Vanderhye P.C.

(57) ABSTRACT

A motor current (driving current of motor) is estimated based on a target motor speed, an actual motor speed, and an engine speed. When the estimated motor current exceeds the upper limit value equivalent to a heat generation limiting current, the motor current is restricted by restricting a variation (motor speed F/B amount) in target motor speed outputted to an EDU from an ECU. If it is continued that a deviation between the target motor speed and the actual motor speed exceeds a predetermined value, the estimated motor current exceeds this upper limit value and the restricting action of the motor current is continued.

14 Claims, 8 Drawing Sheets

VARIABLE VALVE TIMING CONTROLLER FOR INTERNAL COMBUSTION ENGINE

CROSS REFERENCE TO RELATED APPLICATION

This application is based on Japanese Patent Application No. 2006-233282 filed on Aug. 30, 2006, the disclosure of which is incorporated herein by reference. This application is also related to co-pending commonly assigned application Ser. No. 11/896,119 filed Aug 29, 2007.

FIELD OF THE INVENTION

The present invention relates to a variable valve timing controller which includes an electric motor as a driving source. A rotation speed of the electric motor is varied to adjust a rotational phase of the camshaft relative to a crankshaft, whereby a valve timing of an intake valve and/or an exhaust valve of an internal combustion engine is adjusted.

BACKGROUND OF THE INVENTION

In order to perform electronic control of the variable valve timing control, the variable valve timing controller which has the motor as a source of the drive has been developed. The variable valve timing controller described in JP-2006-70754A (US2006/0042578A1) includes a first gear, a second gear, a phase changing gear, and an electric motor. The first gear (outer gear) is concentrically arranged with the camshaft and is rotated with the rotation driving force of the crankshaft. The second gear (inner gear) rotates together with the camshaft. The phase changing gear (planet gear) transmits the torque of the first gear to the second gear, and varies the rotational phase of the second gear relative to the first gear. The motor is coaxially provided to the camshaft so that the revolution speed of the phase changing gear is controlled. The number of teeth of the first gear, the second gear, and the phase changing gear is determined so that the camshaft may rotate with one half of the rotational speed of the rotational speed of the crankshaft. And when not varying valve timing, the rotational speed of the motor coincides with the rotational speed of the camshaft, and the revolution speed of the phase changing gear coincides with the rotational speed of the camshaft. When varying valve timing, the motor speed is varied relative to the rotational speed of the camshaft, and the revolution speed of the phase changing gear is varied relative to the rotational speed of the camshaft. Thereby, the difference between the rotational phase of the first gear and the second gear is varied.

In the above motor drive variable valve timing controller, as a driving current of the motor ("motor current") increases during the variable valve timing control, the heat value of the motor increases and a coil temperature rises. The motor current is feedback controlled so that a deviation between the target motor speed and the actual motor speed is decreased. If it is continued that the deviation is larger than a predetermined value for a long period, there is a possibility that the motor current increases and the coil temperature of the motor may exceed allowable temperature, which causes durability deterioration and malfunction of the motor.

SUMMARY OF THE INVENTION

The present invention is made in view of the above matters, and it is an object of the present invention to provide a variable valve timing controller which adjusts valve timing by use of an electric motor and is able to restrict an excessive temperature rising of a motor coil According to the present invention, a variable valve timing controller includes a target motor speed computing means for computing a target motor speed based on a rotation speed of the internal combustion engine and a deviation between a target camshaft phase and an actual camshaft phase. The controller further includes a motor drive control means for feedback controlling a motor current representing a driving current of the motor in such a manner as to decrease a deviation between the target motor speed and an actual motor speed. The controller further includes a motor current restricting means for restricting the motor current when the motor current estimated by the motor current estimating means exceeds an upper limit value. The upper limit value is established in such a manner that the estimated motor current exceeds the upper limit value and a restriction operation of the motor current by the motor current restricting means is continued when it is continued that the deviation between the target motor speed and the actual motor speed is not less than a specified value.

In a case that the state where the deviation of the target motor speed and the actual motor speed does not become small will continue, the restricting action of the motor current can be continued, and it can be possible to restrict the motor current. Hence, the heat value of motor may not exceed the heat generation limit, and it can be prevented that the coil temperature of motor exceeds the allowable temperature range. The durability deterioration and malfunction of motor can be prevented.

DETAILED DESCRIPTION OF THE PREFERRED EMBODIMENTS

An embodiment of the present invention will be described hereinafter.

Figure 1:
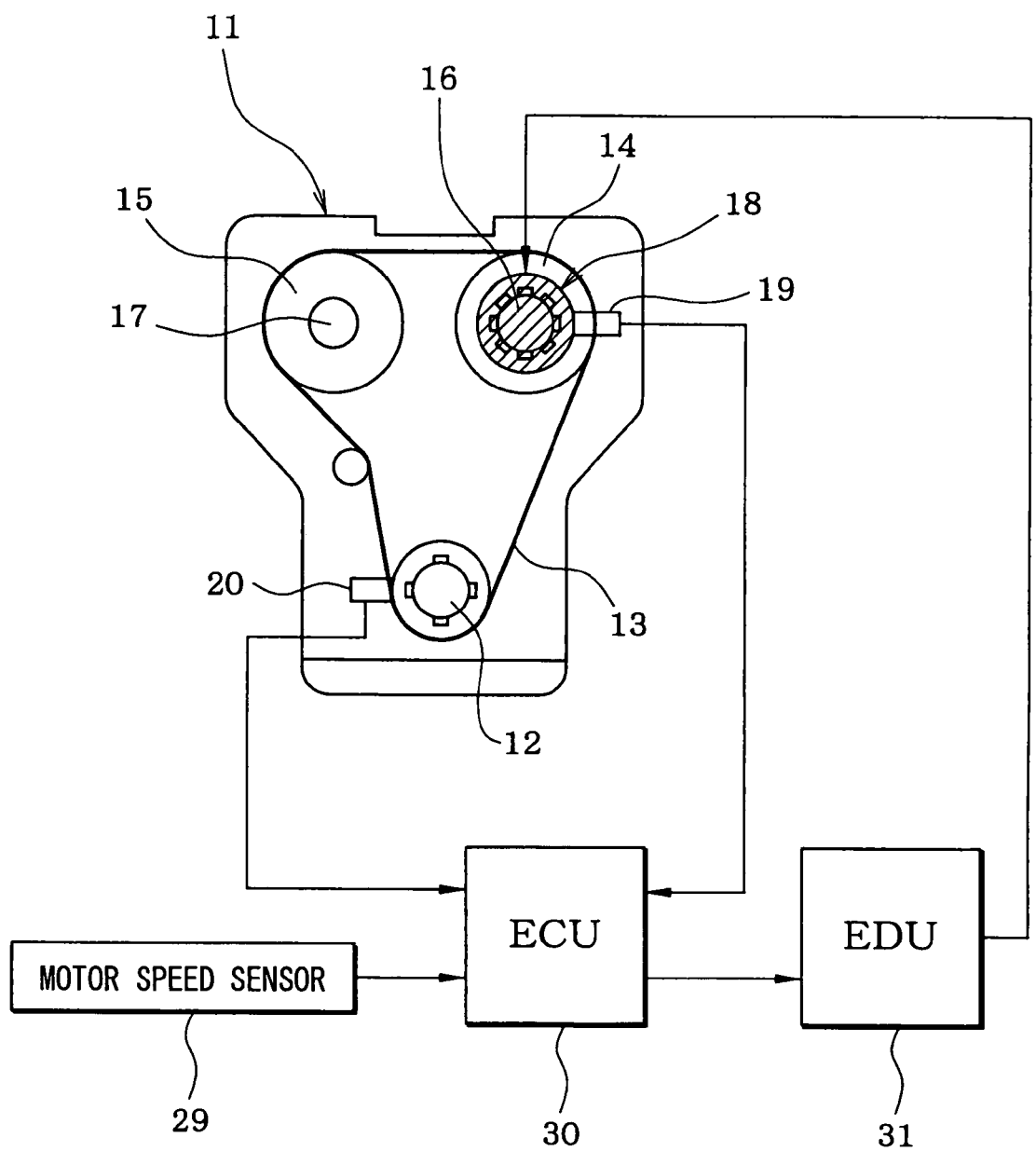
FIG. 1 is a schematic view showing an engine control system according to an embodiment of the present invention.

FIG. 1 schematically shows a whole structure of an engine control system. An internal combustion engine 11, which is referred to as an engine hereinafter, includes a crankshaft 12. A driving force of the crankshaft 12 is transmitted to an intake camshaft 16 and an exhaust camshaft 17 through a timing chain 13 (or a timing belt) and sprockets 14, 15. A variable valve timing controller 18, which includes an electric motor, is coupled to the intake camshaft 16. The variable valve timing controller 18 varies a rotational phase (camshaft phase) of the intake camshaft 16 relative to the crankshaft 12 so that the valve timing of an intake vale (not shown) is adjusted.

A cam angle sensor 19 is provided around the intake camshaft 16. The cam angle sensor 19 outputs a cam angle signal every predetermined cam angle of the intake camshaft 16. A crank angle sensor 20 is provided around the cranks shaft 12. The crank angle sensor 20 outputs a crank angle signal every predetermined crank angle.

Figure 2:
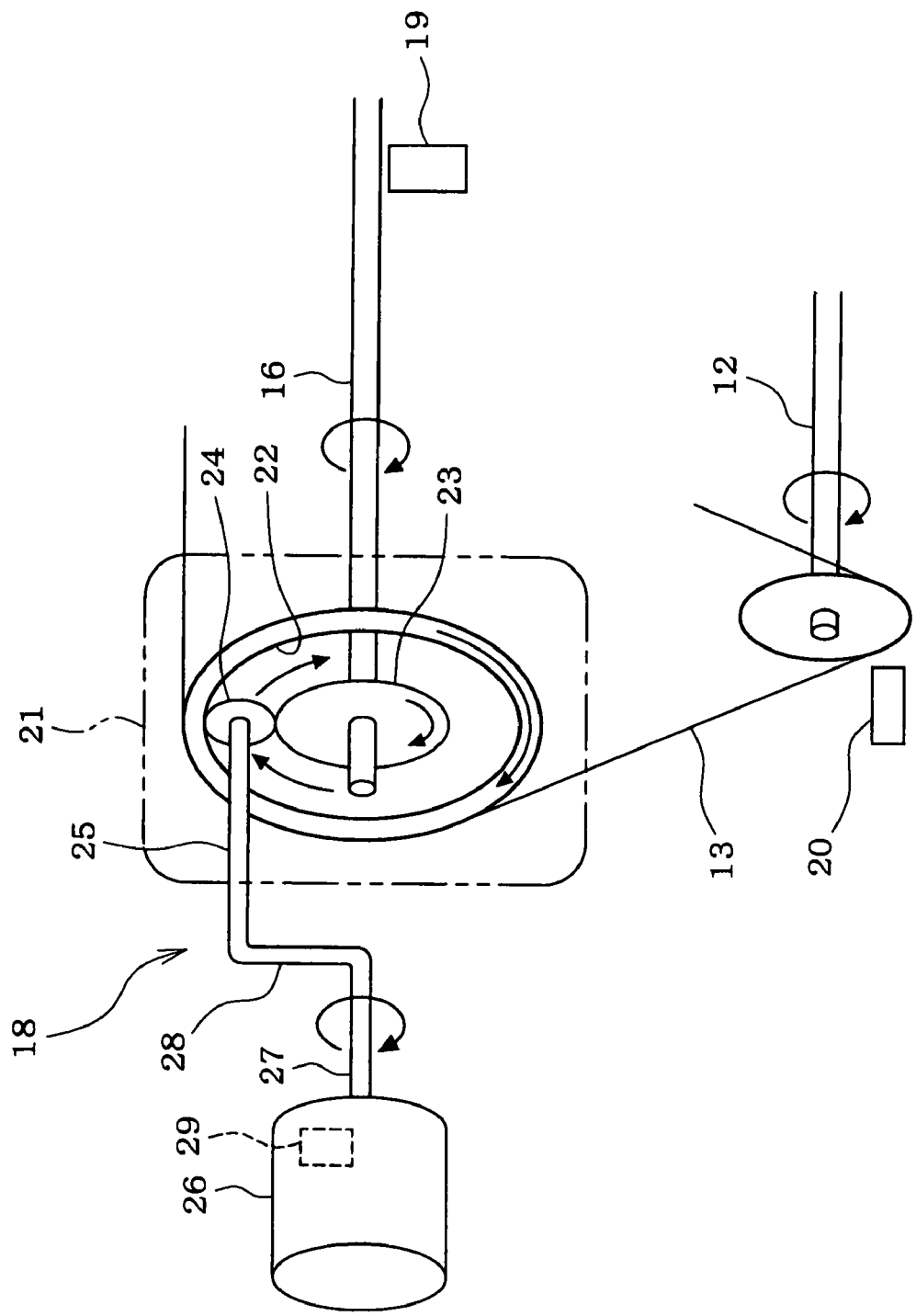
FIG. 2 is a schematic view showing a variable valve timing controller.

Referring to FIG. 2, a structure of the variable valve timing controller 18 is described. The variable valve timing controller 18 includes a phase control mechanism 21. The phase control mechanism 21 includes an outer gear 22 (a first gear), an inner gear 23 (a second gear), and a planet gear 24 (a phase changing gear). The outer gear 22 is concentrically arranged with the intake camshaft 16 and has inner teeth. The inner gear 23 is concentrically arranged with the outer gear 22 and has outer teeth. The planet gear 24 is arranged between the outer gear 22 and the inner gear 23 to be engaged with both gears 22, 23. The outer gear 22 rotates integrally with the sprocket 14 which rotates in synchronization with the crankshaft 12, and the inner gear 23 rotates integrally with the intake camshaft 16. Engaging with the outer gear 22 and the inner gear 23, the planet gear 24 rotates around the inner gear 23 to transfer a rotation force from the outer gear 22 to the inner gear 23. A rotational phase of the inner gear 23 (camshaft phase) relative to the outer gear 22 is adjusted by varying a revolution speed of the planet gear 24 relative to the rotation speed of the inner gear 23.

The number of teeth of the outer gear 22, the inner gear 23 and the planet gear 24 are determined in such a manner that the intake camshaft 16 rotates in a half speed of the crankshaft 12.

(Rotational speed of the intake camshaft 16)=(Rotational speed of the crankshaft 12)×½

The engine 11 is provided with a motor 26 which varies the revolution speed of the planet gear 24. A rotation shaft 27 of the motor 26 is concentrically arranged with the intake camshaft 16, the outer gear 22, and the inner gear 23. A connecting shaft 28 connects the rotation shaft 27 with a supporting shaft 25 of the planet gear 24. When the motor 26 is energized, the planet gear 24 rotates on the supporting shaft 25 and orbits around the inner gear 23. Besides, the motor 26 is provided with a motor speed sensor 29 which outputs a rotational motor speed signal.

When the motor 26 is not energized, the rotation shaft 27 rotates in synchronization with the intake camshaft 16. That is, when the rotation speed RM of the motor 26 is consistent with the rotation speed RC of the intake camshaft 16, and the revolution speed of the planet gear 24 is consistent with the rotational speed of the inner gear 23, a difference between a rotational phase of the outer gear 22 and a rotational phase of the inner gear 23 is maintained as a current difference to maintain the valve timing (camshaft phase) as the current valve timing.

When the rotation speed RM of the motor 26 is made higher than the rotational speed RC of the intake camshaft 16, that is, when the revolution speed of the planet gear 24 is made higher than the rotational speed of the inner gear 23, the rotational phase of the inner gear 23 relative to the outer gear 22 is advanced so that the valve timing of the intake valve is advanced.

When the rotation speed RM of the motor 26 is made lower than the rotation speed RC of the intake camshaft 16, that is, when the revolution speed of the planet gear 24 is made lower than the rotational speed of the inner gear 23, the rotational phase of the inner gear 23 relative to the outer gear 22 is retarded so that the valve timing of the intake valve is retarded.

The outputs of the sensors are inputted into an electronic control unit 30, which is referred to as an ECU 30 hereinafter. The ECU 30 includes a microcomputer which executes engine control programs stored in a ROM (read only memory) to control a fuel injection and an ignition timing according to an engine driving condition.

Figure 3:
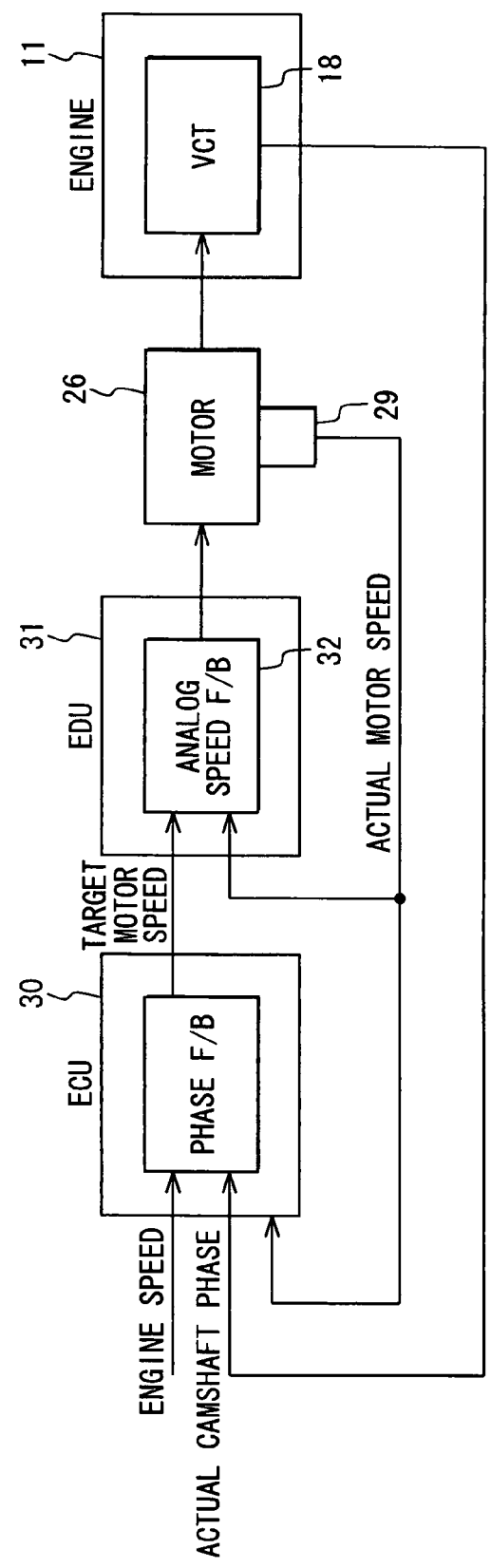
FIG. 3 is a block diagram showing the structure of the control system of the variable valve timing controller.

Moreover, ECU30 calculates a rotational phase (actual camshaft phase) of the camshaft 16 relative to the crankshaft 12 based on the output of the cam angle sensor 19 and the crank angle sensor 20. The ECU30 calculates the target camshaft phase (target valve timing) according to an engine operating conditions. The ECU30 calculates the target motor speed based on the engine speed and a deviation between the target camshaft phase and the actual camshaft phase. And as shown in FIG. 3, the ECU30 outputs the signal indicative of the target motor speed toward the motor drive circuit (EDU) 31.

The EDU31 has an analog rotating-speed feedback circuit 32 which performs feedback control of the duty of the voltage applied to the motor 26 so that the deviation of the target motor speed and an actual motor speed is decreased. The EDU31 performs a feedback control of the actual motor speed to the target motor speed, and performs a feedback control of the actual camshaft phase to the target camshaft phase. "Feedback" is expressed as "F/B" in the following description.

The ECU30 estimates a driving current (motor current) of the motor 26 based on the target motor speed and the actual motor speed. When the estimated motor current exceeds the upper limit value equivalent to a heat generation limiting current, the ECU 30 restricts a variation in target motor speed to be outputted to the EDU 31. This variation corresponds to a motor speed F/B amount.

Since it is not avoided that the estimated error arises in estimating the motor current based on the target motor speed, the actual motor speed, and engine speed, the estimated motor current may be less than the upper limit value in a case that the actual motor current is over the upper limit value. The EDU 31 controls the driving current of the motor to decrease the deviation between the target motor speed and the actual motor speed. If the deviation between the target motor speed and the actual motor speed has been large for a long period, there is a possibility that the actual motor current increases to exceed the upper limit value. If the estimated motor current is less than the upper limit value with the estimated error, the restricting action of the motor current will be canceled. The actual motor current increases, and the coil temperature of the motor may exceed an allowable temperature and causes a durability deterioration and a malfunction of the motor.

As this measure, in the present embodiment, if the deviation of the target motor speed and the actual motor speed has been larger than a specified value for a certain period, the estimated motor current exceeds the upper limit value and the restricting action of the motor current will be continued. In a case that the state where the deviation of the target motor speed and the actual motor speed does not become small will continue, the restricting action of the motor current can be continued, and it can be possible to restrict the motor current. Hence, the heat value of motor 26 may not exceed the heat generation limit, and it can be prevented that the coil temperature of motor 26 exceeds the allowable temperature range. The durability deterioration and failure of motor 26 can be prevented.

Figure 4:
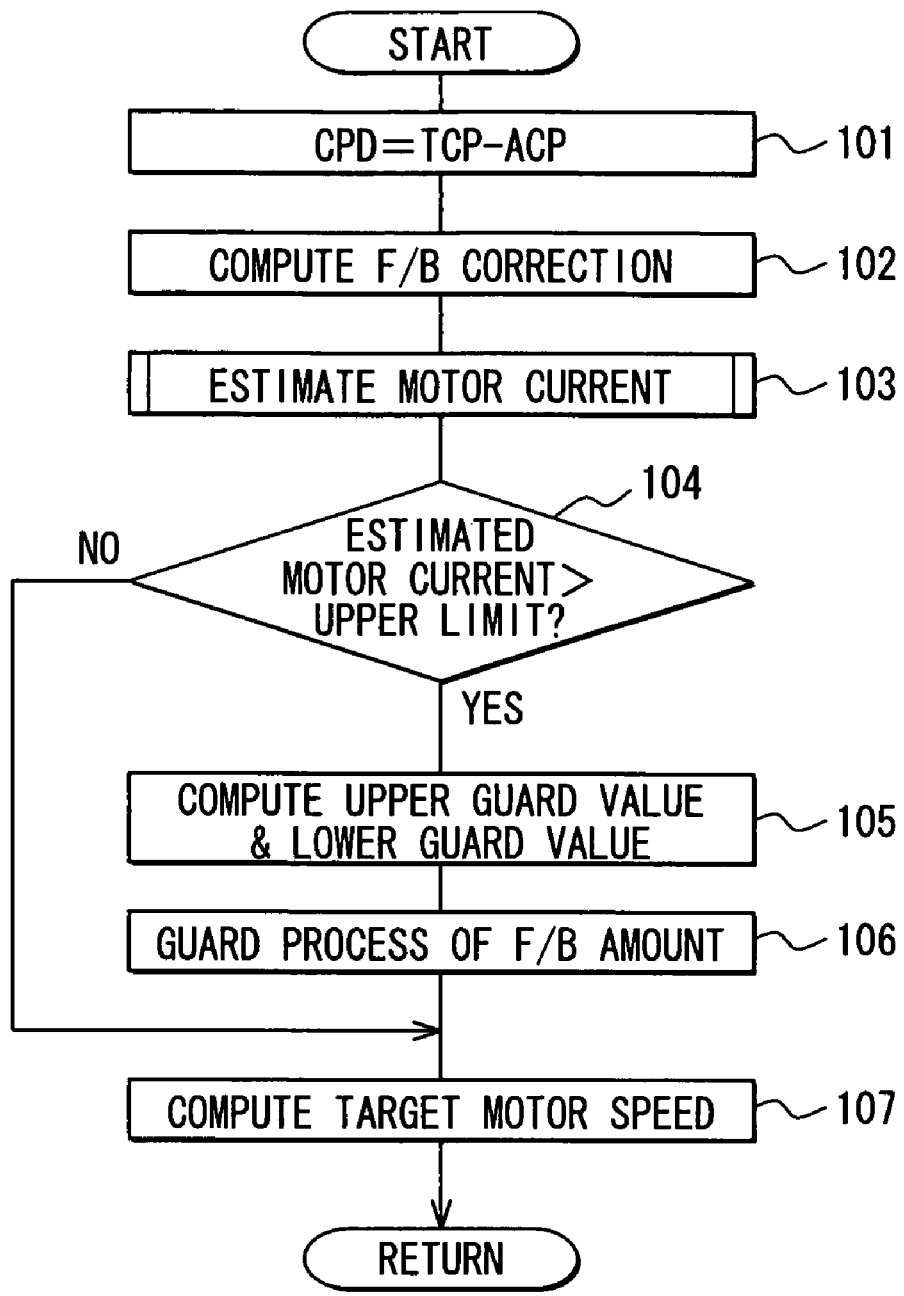
FIG. 4 is a flow chart showing a processing of the target motor speed operation program.
Figure 5:
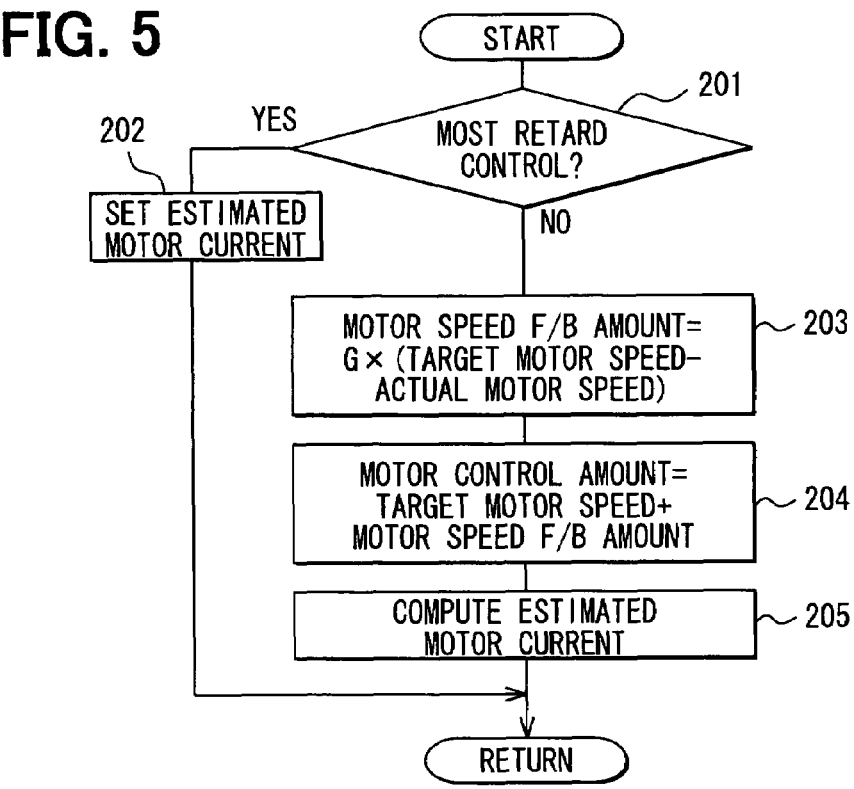
FIG. 5 is a flow chart showing a processing of the motor current estimation program.

Hereafter, the processing of each program of FIGS. 4 and 5 which the ECU30 executes is explained.

[Target Motor Speed Computation Program]

The ECU30 executes the target motor speed computation program shown in FIG. 4 during the engine operation.

In step 101, a deviation between the target camshaft phase and the actual camshaft phase is computed. This deviation is referred to as the camshaft phase deviation.

Camshaft phase deviation (CPD)=Target camshaft phase (TCP)-Actual camshaft phase (ACP)

Figure 6:
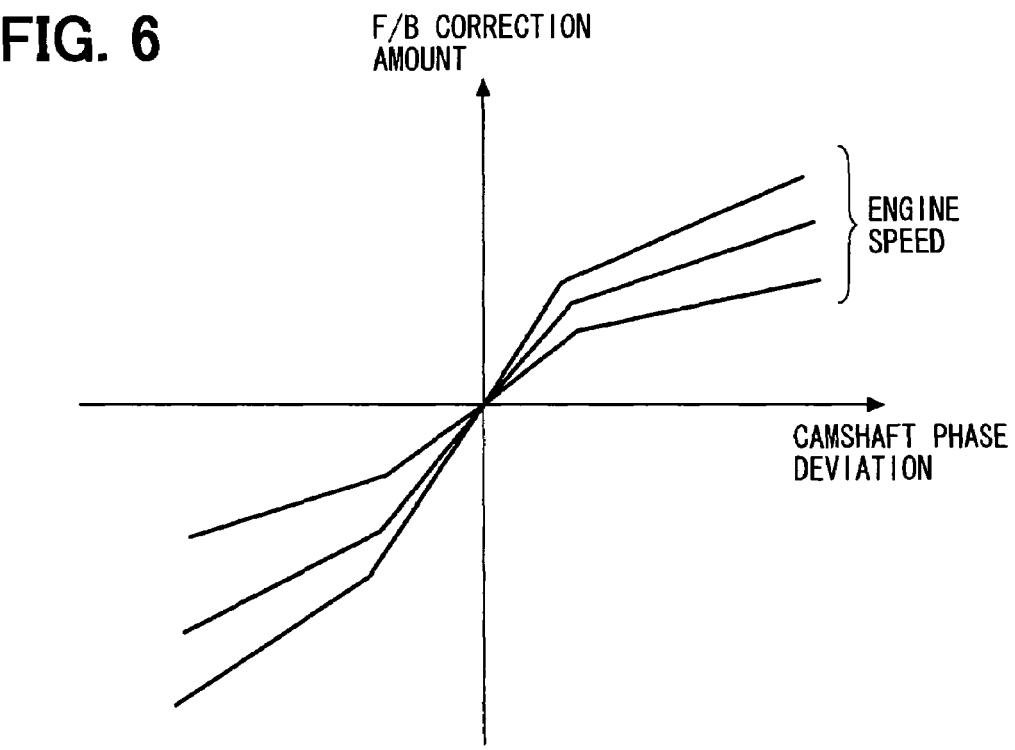
FIG. 6 is a chart schematically showing a motor speed F/B amount map.

Then, the procedure proceeds to step 102 in which the rotational speed F/B correction amount according to the present engine speed and the camshaft phase deviation is computed with reference to the rotational speed F/B correction amount map shown in FIG. 6. As shown in the rotational speed F/B correction amount map of FIG. 6, as camshaft phase deviation (CPD) increases, the rotational speed F/B correction amount increases, and as the engine speed increases, the rotational speed F/B correction amount increases.

After computing the rotational speed F/B correction amount, the procedure proceeds to step 103 in which a motor current estimation program shown in FIG. 5 is executed. In step 103, the estimated motor current is computed based on the instant target motor speed and the instant actual motor speed. Then, the procedure proceeds to step 104 in which it is determined whether the estimated motor current exceeds the upper limit value equivalent to the heat generation limiting current value. In the present embodiment, when it is continued that the deviation exceeds the specified value, even if the estimated motor current exceeds this upper limit value, the restricting action of the motor current will be continued.

When the answer is No in step 104, the procedure proceeds to step 107 in which the target motor speed is established based on the following equation without restricting the rotational speed F/B correction amount computed in step 102.

Target motor speed (TMS)=Base target motor speed (BTMS)+Rotational speed $F/B$ correction amount (RSFBC)

Here, the base target motor speed is the motor speed which is in agreement with the camshaft rotational speed (crankshaft rotation speed×½).

Figure 7:
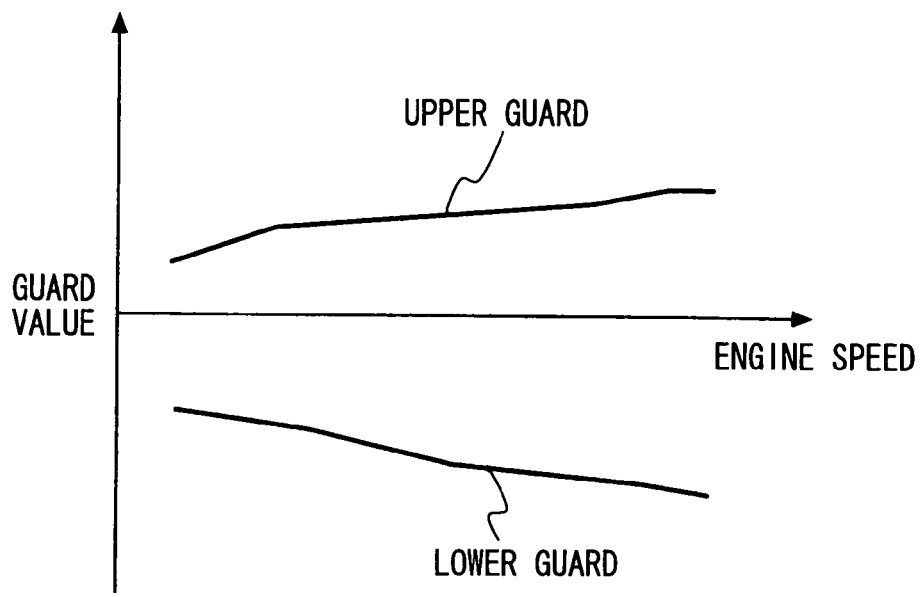
FIG. 7 is a chart schematically showing an upper and lower guard value map.

When the answer is Yes in step 104, the procedure proceeds to step 105 in which an upper guard value and a lower guard value are computed based on the instant engine speed according to an upper-lower guard value map shown in FIG. 7. As shown in FIG. 7, as the engine speed increases, absolute values of the upper guard value and the lower guard value increase. The guard values may be established according to the engine speed and the camshaft phase deviation. For simplification of data processing, the guard values may be alternatively established as predetermined constant values.

Then, the procedure proceeds to step 106 in which the motor speed F/B amount computed in step 102 is guard-processed by using of the upper and lower guard values computed in step 105. That is, when the motor speed F/B amount is larger than the upper limit guard value, the motor speed F/B amount is restricted with the upper limit guard value, and the motor speed F/B amount coincides with the upper limit guard value. When the motor speed F/B amount is less than the lower limit guard value, the motor speed F/B amount is restricted with the lower limit guard value, and the motor speed F/B amount coincides with the lower limit guard value. In a case that the rotational speed F/B correction amount is within a range between the upper guard value and the lower guard value, the rotational speed F/B correction amount is not changed. In steps 104, 105 and 106, electric current applied to the motor is restricted.

Then, the procedure proceeds to step 107 in which the target motor speed is computed by using of the guard-processed rotational speed F/B correction amount.

Target motor speed (TMS)=Base target motor speed (BTMS)+Guard-processed Rotational speed F/B correction amount (G-RSFBC)

The ECU30 outputs the signal indicative of the target motor speed calculated by the above process toward the EDU31.

[Motor Current Estimation Program]

The motor current estimation program shown in FIG. 5 is a subroutine performed in step 103 of FIG. 4. In step 201, it is determined whether a most retard control is executed. In the most retard control, the camshaft phase is fixed at the most retarded phase (reference phase). When the answer is Yes in step 201, the procedure proceeds to step 202 in which an indication current is set as an estimated motor current. The indication current is a motor current which is determined based on an indication duty at the most retard control.

Meanwhile, when the answer is No in step 201, the procedure proceeds to step 203 in which the deviation between the target motor speed and the actual motor speed is multiplied by a F/B gain G to obtain the motor speed F/B amount.

Motor speed $F/B$ amount=$G$×(Target motor speed– Actual motor speed)

Then, the procedure proceeds to step 204 in which the motor speed F/B amount computed in step 203 is added to the target motor speed to obtain a motor control mount.

Motor control amount=Target motor speed+Motor speed $F/B$ amount

Figure 8:
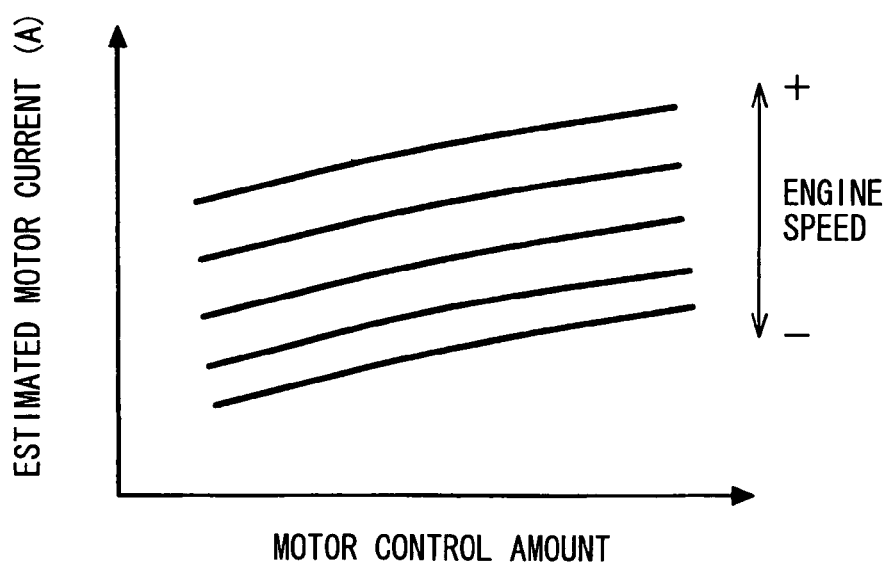
FIG. 8 is a chart schematically showing an estimated motor current map.

Then, the procedure proceeds to step 205 in which the instant motor control amount and the estimated motor current according to the engine speed are computed with reference to an estimated motor current map shown in FIG. 8. In the estimated motor current map of FIG. 8, as the motor control amount increases, the estimated motor current increases, and as the engine speed increases, the estimated motor current increases. Besides, the estimated motor current may be computed only based on the motor control amount.

Besides, the estimated motor current may be computed based on a map which has the target motor speed, the actual motor speed, and the engine speed as parameters. Alternatively, the estimated motor current may be computed based on a map which has the target motor speed and the actual motor speed as parameters. The estimated motor current may be computed by taking into consideration the parameters (for example, battery voltage, camshaft phase deviation) other than the above.

A control process of the present embodiment will be described hereinafter based on time charts shown in FIGS. 9 and 10.

Figure 9:
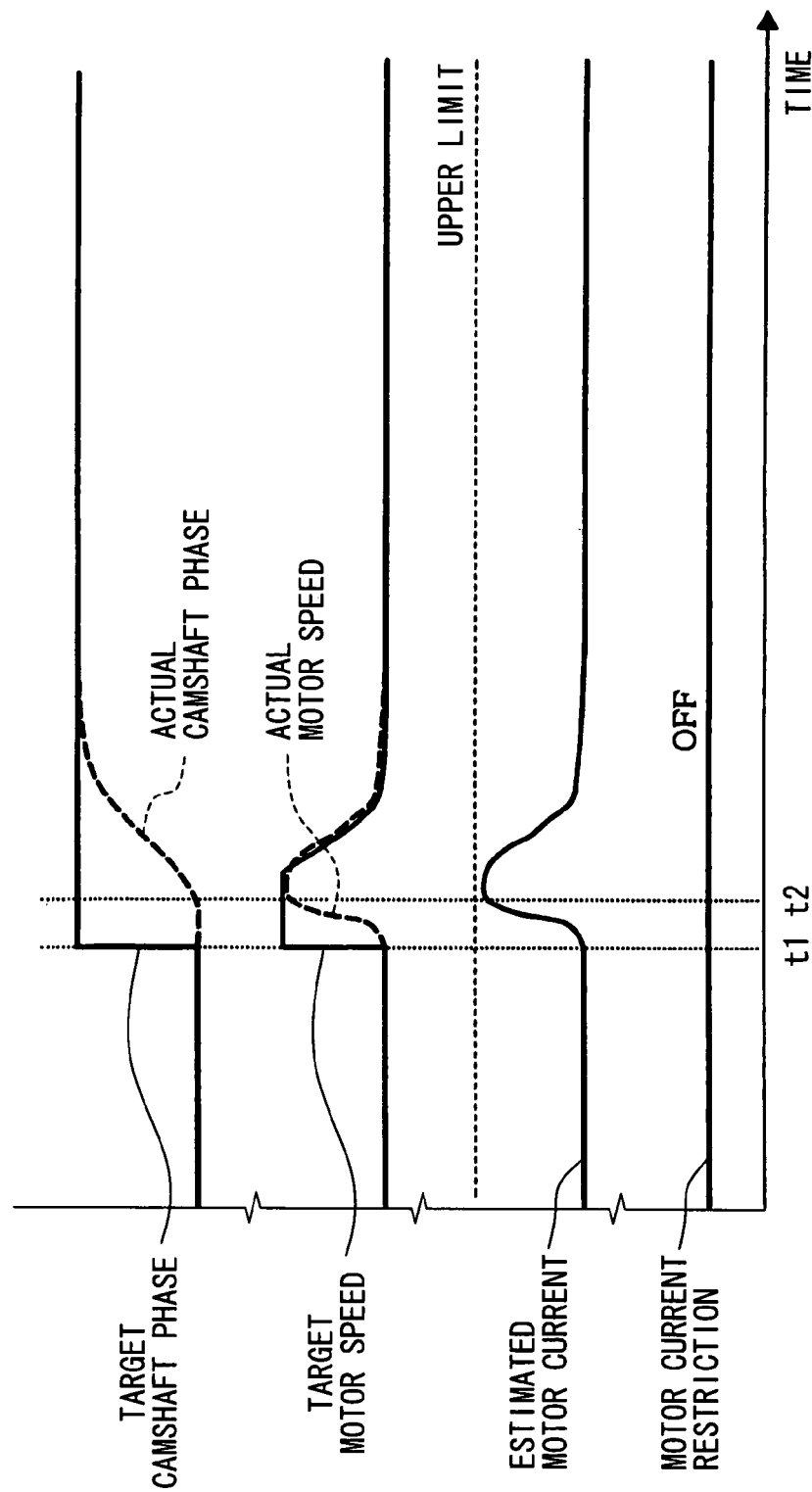
FIG. 9 is a time chart for explaining an ordinary control.

FIG. 9 shows the example of control in which the actual camshaft phase (actual motor speed) varies according to a change of the target camshaft phase (target motor speed) in a usual responsivity. The target motor speed changes stepwise at time t1 in which the target camshaft phase changes stepwise. Then, the actual motor speed starts to change, and the estimated motor current starts to increase. Then, the actual camshaft phase starts to change toward the target camshaft phase.

The actual motor speed reaches the target motor speed at time t2. After that, as the deviation between the target camshaft phase and the actual camshaft phase decreases, the motor speed F/B amount decreases. The target motor speed decreases, and the actual motor speed decreases. The estimated motor current also decreases. Since such control is performed in an area in which the estimated motor current is always becomes less than or equal to the upper limit value, the restricting action (guard process of motor speed F/B amount) of the motor current is not performed.

Figure 10:
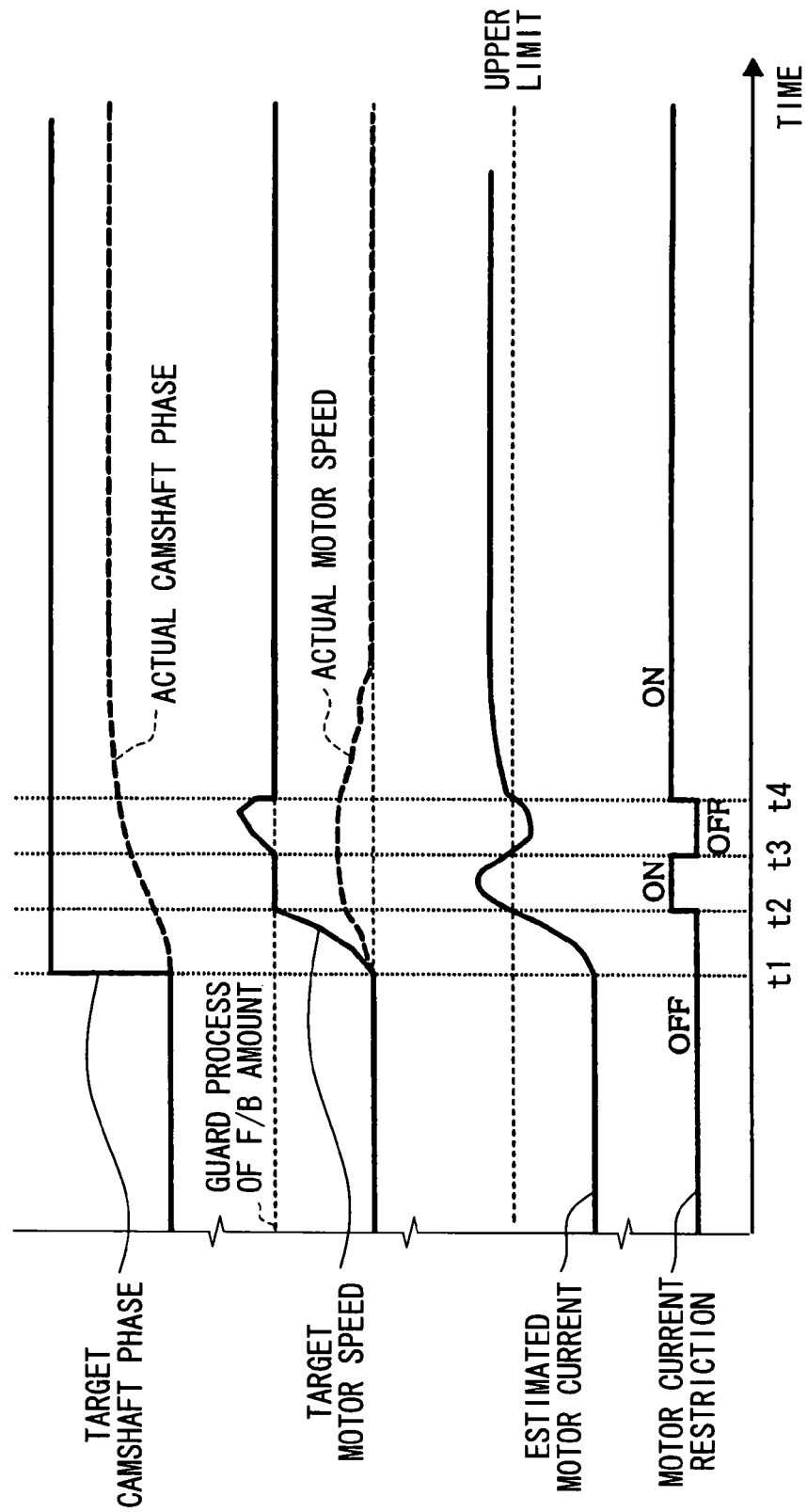
FIG. 10 is a time chart for explaining a control in which responsivity is deteriorated.

Meanwhile, FIG. 10 shows the example in which the responsibility of the actual camshaft phase (actual motor speed) relative to a change of the target camshaft phase (target motor speed) is deteriorated. The actual camshaft phase (actual motor speed) cannot follow the target camshaft phase (target motor speed), and the motor 26 rotates in a camshaft rotation speed (crankshaft rotation speed×½).

In this example of control, even if the target camshaft phase stepwise changes at time t1, the target motor speed does not change stepwise. There is also less change of the actual camshaft phase (actual motor speed) than usual. Accordingly, since the motor speed F/B amount becomes larger than usual, the estimated motor current exceeds the upper limit value, and the restricting action (guard process of motor speed F/B amount) of the motor current is started at the time t2. When the estimated motor current decreases temporarily and is less than the upper limit value, the restricting action of the motor current is canceled at time t3. Therefore, the estimated motor current increases again, and exceeds the upper limit value. The restricting action of the motor current is again started at time t4. Then, the actual camshaft phase (actual motor speed) cannot follow the target camshaft phase (target motor speed), but, in both deviations, the state beyond the specified value continues. Therefore, the estimated motor current is maintained in such a manner as to exceed the upper limit value, and the restricting action of the motor current is continued.

According to present embodiment, the motor current is estimated based on the target motor speed, the actual motor speed, and the engine speed. When the estimated motor current exceeds the upper limit value, the variation (motor speed F/B amount) in target motor speed outputted to EDU31 is restricted, and the motor current is restricted. Therefore, it is possible to restrict the motor current so that the heat value of motor 26 may not exceed the heat generation limit.

The EDU 31 controls the driving current of the motor to decrease the deviation between the target motor speed and the actual motor speed. If it is continued that the deviation between the target motor speed and the actual motor speed is larger than the predetermined value for a long period, there is a possibility that the actual motor current increases to exceed the upper limit value. If the estimated motor current is less than the upper limit value with the estimated error, the restricting action of the motor current will be canceled. The actual motor current increases, and the coil temperature of the motor may exceed an allowable temperature and causes a durability deterioration and a malfunction of the motor.

In the present embodiment, when the deviation of the target motor speed and the actual motor speed has been larger than a specified value for a certain period, the estimated motor current exceeds the upper limit value and the restricting action of the motor current will be continued. In a case that the state where the deviation of the target motor speed and the actual motor speed does not become small will continue, the restricting action of the motor current can be continued, and it can be possible to restrict the motor current. Hence, the heat value of motor 26 may not exceed the heat generation limit, and it can be prevented that the coil temperature of motor 26 exceeds the allowable temperature range. The durability deterioration and failure of motor 26 can be prevented.

In the present invention, the duty of the voltage applied to motor 26 is estimated as the information of the motor current, and when the estimated duty exceeds the upper limit value, the motor current may be restricted. The duty estimation can be performed using the same map as FIG. 8.

Besides, the present invention is not limited to the variable valve timing controller of the intake valve, but may be applied to the variable valve timing controller of the exhaust valve. Furthermore, the phase variable mechanism of the variable valve timing device 18 is not limited to the planetary gear mechanism. Other mechanisms are employable when the valve timing is changed by varying the rotational speed of the motor relative to the rotational speed of the camshaft.

What is claimed is:

1. A variable valve timing controller adjusting a valve timing of an intake valve and/or an exhaust valve by varying a speed of an electric motor relative to a rotational speed of a camshaft in a manner as to vary a camshaft phase representing a rotational phase of the camshaft relative to a crankshaft of an internal combustion engine, the variable valve timing controller comprising:
   a target motor speed computing means for computing a target motor speed based on a rotation speed of the internal combustion engine and a deviation between a target camshaft phase and an actual camshaft phase;
   a motor drive control means for feedback controlling a motor current representing a driving current of the motor in a manner as to decrease a deviation between the target motor speed and an actual motor speed;
   a motor current estimating means for estimating the motor current based on at least the target motor speed and the actual motor speed; and
   a motor current restricting means for restricting the motor current when the motor current estimated by the motor current estimating means exceeds an upper limit value, wherein
   the upper limit value is established in a manner that the estimated motor current exceeds the upper limit value and a restriction operation of the motor current by the motor current restricting means is continued when it is continued that the deviation between the target motor speed and the actual motor speed is not less than a specified value.

2. A variable valve timing controller according to claim 1, wherein
   the upper limit value is established according to a rotation speed of the internal combustion engine.

3. A variable valve timing controller according to claim 1, wherein
   the motor current estimating means estimates the motor current based on at least the target motor speed, the actual motor speed, and the rotation speed of the internal combustion engine.

4. A variable valve timing controller according to claim 1, wherein
   the motor current restricting means restricts the motor current by restricting a variation in target motor speed when the estimated motor current exceeds the upper limit value.

5. A variable valve timing controller adjusting a valve timing of an intake valve and/or an exhaust valve by varying a speed of an electric motor relative to a rotational speed of a camshaft in a manner as to vary a camshaft phase representing a rotational phase of the camshaft relative to a crankshaft of an internal combustion engine, the variable valve timing controller comprising:

a target motor speed computing means for computing a target motor speed based on a rotation speed of the internal combustion engine and a deviation between a target camshaft phase and an actual camshaft phase;

a motor drive control means for feedback controlling a motor current representing a driving current of the motor in a manner as to decrease a deviation between the target motor speed and an actual motor speed;

a motor current estimating means for estimating the motor current; and a motor current restricting means for restricting the motor current when the motor current estimated by the motor current estimating means exceeds an upper limit value, wherein the upper limit value is established in a manner that the estimated motor current exceeds the upper limit value and a restriction operation of the motor current by the motor current restricting means is continued when it is continued that the deviation between the target motor speed and the actual motor speed is not less than a specified value;

the motor current restricting means restricts the motor current by restricting a variation in target motor speed when the estimated motor current exceeds the upper limit value;

the target motor speed computing means computes a motor speed correction amount based on the rotation speed of the internal combustion engine and the deviation between the target camshaft phase and the actual camshaft phase, and computes the target motor speed by correcting a base target motor speed, which corresponds to a rotation speed of the camshaft, and the motor current restricting means restricts the variation in target motor speed by restricting the motor speed correction amount when the estimated motor current exceeds the upper limit value.

6. A variable valve timing controller according to claim 5, wherein the motor current restricting means varies a restricting range of the motor speed correction amount according to the rotation speed of the internal combustion engine.

7. A variable valve timing controller adjusting a valve timing of an intake valve and/or an exhaust valve by varying a speed of an electric motor relative to a rotational speed of a camshaft in a manner as to vary a camshaft phase representing a rotational phase of the camshaft relative to a crankshaft of an internal combustion engine, the variable valve timing controller comprising:

a target motor speed computing means for computing a target motor speed based on a rotation speed of the internal combustion engine and a deviation between a target camshaft phase and an actual camshaft phase;

a motor drive control means for feedback controlling a motor current representing a driving current of the motor in a manner as to decrease a deviation between the target motor speed and an actual motor speed;

a motor current estimating means for estimating the motor current; and a motor current restricting means for restricting the motor current when the motor current estimated by the motor current estimating means exceeds an upper limit value, wherein the upper limit value is established in a manner that the estimated motor current exceeds the upper limit value and a restriction operation of the motor current by the motor current restricting means is continued when it is continued that the deviation between the target motor speed and the actual motor speed is not less than a specified value, the motor drive control means adjusts a duty ratio of voltage applied to the motor in order to control the motor current, the motor current estimating means estimates the duty ratio of voltage applied to the motor as information of the motor current, and the motor current restricting means restricts the motor current when the duty ratio estimated by the motor current estimating means exceeds the upper limit value.

8. A variable valve timing controller adjusting a valve timing of an intake valve and/or an exhaust valve by varying a speed of an electric motor relative to a rotational speed of a camshaft in a manner as to vary a camshaft phase representing a rotational phase of the camshaft relative to a crankshaft of an internal combustion engine, the variable valve timing controller comprising:

a target motor speed computer which computes a target motor speed based on a rotation speed of the internal combustion engine and a deviation between a target camshaft phase and an actual camshaft phase;

a motor drive controller which feedback-controls a motor current representing a driving current of the motor in a manner as to decrease a deviation between the target motor speed and an actual motor speed;

a motor current estimator which estimates the motor current based on at least the target motor speed and the actual motor speed; and a motor current restrictor which restricts the motor current when the motor current estimated by the motor current estimator exceeds an upper limit value, wherein the upper limit value is established in a manner that the estimated motor current exceeds the upper limit value and a restriction operation of the motor current by the motor current restrictor is continued when it is continued that the deviation between the target motor speed and the actual motor speed is not less than a specified value.

9. A variable valve timing controller according to claim 8, wherein the upper limit value is established according to a rotation speed of the internal combustion engine.

10. A variable valve timing controller according to claim 8, wherein the motor current estimator estimates the motor current based on at least the target motor speed, the actual motor speed, and the rotation speed of the internal combustion engine.

11. A variable valve timing controller according to claim 8, wherein the motor current restrictor restricts the motor current by restricting a variation in target motor speed when the estimated motor current exceeds the upper limit value.

12. A variable valve timing controller according to claim 8, wherein the target motor speed computer computes a motor speed correction amount based on the rotation speed of the internal combustion engine and the deviation between the target camshaft phase and the actual camshaft phase, and computes the target motor speed by correcting a base target motor speed, which corresponds to a rotation speed of the camshaft, and the motor current restrictor restricts the variation in target motor speed by restricting the motor speed correction amount when the estimated motor current exceeds the upper limit value.

13. A variable valve timing controller according to claim 12, wherein the motor current restrictor varies a restricting range of the motor speed correction amount according to the rotation speed of the internal combustion engine.

14. A variable valve timing controller according to claim 8, wherein the motor drive controller adjusts a duty ratio of voltage applied to the motor in order to control the motor current, the motor current estimator estimates the duty ratio of voltage applied to the motor as information of the motor current, and the motor current restrictor restricts the motor current when the duty ratio estimated by the motor current estimator exceeds the upper limit value.

\* \* \* \* \*